United States Patent [19]

Brückman

[11] 4,316,821

[45] Feb. 23, 1982

[54] METHOD FOR THE PRODUCTION OF CATALYSTS

[75] Inventor: Katarzyna Brückman, Uxbridge, England

[73] Assignee: Tioxide Group Limited, Billingham, England

[21] Appl. No.: 195,255

[22] Filed: Oct. 8, 1980

[30] Foreign Application Priority Data

Sep. 16, 1980 [GB] United Kingdom ............... 29800/80

[51] Int. Cl.$^3$ .......................... B01J 21/06; B01J 23/22
[52] U.S. Cl. ................................................... 252/461
[58] Field of Search ....................... 252/461; 260/346.7

[56] References Cited

U.S. PATENT DOCUMENTS 3,448,163 6/1969 Howman et al. ............... 252/461 X
4,228,038 10/1980 König .................................... 252/461

OTHER PUBLICATIONS

Roozeboom et al., "Vanadium Oxide Monolayer Catalysts, I. Preparation, Characterization, and Thermal Stability", Z. Anorg. Allg. Chem: 449, pp. 25–40, (1979).

Primary Examiner—W. J. Shine
Attorney, Agent, or Firm—Schuyler, Banner, Birch, McKie & Beckett

[57] ABSTRACT

A method for the production of a monolayer catalyst by treating the catalyst substrate having bound water residues on its surface and substantially free of physisorbed water with an organic solution of a catalyst precursor, reacting the precursor with the bound water residues, removing excess precursor and solvent and decomposing the precursor to a catalytically effective compound. The catalyst substrate preferably is titanium dioxide and the precursor preferably is vanadium oxychloride.

22 Claims, No Drawings

METHOD FOR THE PRODUCTION OF CATALYSTS

This invention relates to a method for the production of catalysts and particularly to those commonly referred to as monolayer catalysts.

So-called monolayer catalysts consist of a catalyst substrate having on its surface a monolayer of a different compound which is catalytically effective in a chosen chemical reaction. Such monolayer catalysts have been prepared by the repeated treatment of the substrate surface with the vapour of a precursor of the catalytically effective compound with subsequent conversion of the precursor to the compound. However this method is time-consuming and expensive.

A much improved method for the production of monolayer catalysts has now been developed.

According to the present invention a method for the production of a monolayer catalyst comprises mixing a chosen catalyst substrate having bound water residues on its surface and being substantially free of physisorbed water with a catalyst precursor decomposable to a catalytically effective compound with said precursor being dissolved in an organic solvent therefor, allowing said precursor to react with said bound water residues, removing any excess precursor and solvent, decomposing said precursor reacted with said surface to a catalytically effective compound and recovering the so-treated catalyst substrate.

In a preferred form the invention is a method for the production of a catalyst comprising a titanium dioxide substrate carrying a monolayer of vanadium pentoxide.

According to the invention also a preferred method for the production of a monolayer catalyst comprises heating a particulate titanium dioxide substrate to remove substantially all the physisorbed water from the surface of the particles, mixing the particulate titanium dioxide so obtained with vanadium oxychloride dissolved in an organic solvent therefor and agitating the mixture at an elevated temperature to effect combination of the vanadium oxychloride with the surface of the particulate titanium dioxide, separating the so treated substrate from any unreacted vanadium oxychloride and organic solvent, reacting the treated substrate with water to form vanadium pentoxide in association with the surface of the substrate and drying the product prior to optionally heating the product to further activate the catalyst so obtained.

In this specification it is to be understood that reference to "monolayer" is not to be taken as meaning that necessarily the whole of the surface of the substrate is so covered. It is to be understood also that "decomposition" includes "hydrolysis".

Taken in its broadest aspect the invention encompasses the production of monolayer catalyst comprising any suitable substrate such as titanium dioxide, alumina or silica in suitable particulate form and size with any catalytically effective compound such as inorganic polyvalent metal oxides of known catalytic properties such as titanium dioxide, vanadium pentoxide, molybdenum dioxide or other transition metal oxides.

Essentially the invention involves choosing the desired substrate, producing the desired bound surface water concentration, treating with an organic solution of the compound chosen to result in the catalytically effective compound, and decomposing the compound.

The invention will be particularly described in relation to the production of titanium dioxide carrying vanadium pentoxide but it is to be understood that this is not limiting on the general applicability of the invention in producing monolayer catalysts.

The catalyst substrate preferably is particulate titanium dioxide and most preferably is in the anatase form for an oxidation catalyst. The titanium dioxide can be that resulting from either the well-known "sulphate" process or the "chloride" process. Alternatively the titanium dioxide can be that obtained from the neutralisation by ammonia of an aqueous solution of a titanium compound, e.g. titanium tetrachloride, with subsequent calcination of the precipitate.

Initially the catalyst substrate is usually heated at an elevated temperature to reduce substantially, and preferably almost eliminate, any physisorbed water molecules from the surface of the particles of substrate. The substrate can be heated to a temperature of up to 500° C., preferably from 50° C. to 300° C. for a time sufficient to effect the desired result. Ideally the substrate is heated at a temperature of from 100° C. to 200° C. The time of heating is variable but can be up to several days duration, more usually from 1 hour to 40 hours, whilst a period of from 10 to 20 hours is the most desired. During this heat treatment it is believed that physisorbed water molecules are removed from the surface of the substrate leaving bound residues such as water molecules or hydroxyl groups to take part in the subsequent reactions.

The prepared and selected substrate is then mixed with an organic solution of the precursor which on decomposition produces the desired catalytically effective product.

An organic liquid which is a solvent for the precursor can be used to form the organic solution and when the compound is vanadium oxychloride then liquid aromatic hydrocarbons have been found to be particularly useful with benzene, toluene or o-xylene being preferred.

The concentration of the vanadium oxychloride in the solvent can be up to the maximum possible for the particular chosen solvent. In practice the concentration can be from 0.1 to 5 parts by volume of vanadium oxychloride per the 100 parts by volume of the solvent, usually from 0.1 to 0.7 part by volume.

The volume of solution required to treat the substrate depends on the concentration of the precursor in the solution and on the surface area of the substrate. Ideally the amount of the precursor is in excess of that required to provide the monolayer. Typically for a substrate having a surface area of about 10 square meters per gram the amount of precursor is from 0.5 to 10 percent by weight of the weight of substrate, preferably the amount is from 1.5 to 6 percent by weight. The treatment of the substrate with the organic solution can be effected at any chosen temperature up to the boiling point of the solution and when benzene is the solvent then it is preferred to use a temperature of from 30° C. to 80° C. The time of the treatment is such that the reaction reaches equilibrium and naturally this depends on the temperature employed. Normally the time of treatment is up to 24 hours, preferably from 3 to 10 hours.

After treatment with the organic solution the substrate is separated from the solution and washed free of any unreacted compound. Filtration of the catalyst substrate is simple. The separated substrate can be washed with amounts of the organic solvent used to prepare the solution.

The separated and washed substrate usually is then dried to remove any remaining solvent. The drying can be carried out under vacuum or at atmospheric pressure and at elevated temperature, e.g. up to the boiling point of the solvent.

The treated substrate is then decomposed, usually by hydrolysis by reaction of the precursor with water. The water can be as liquid or vapour. Liquid water can be sprayed on to the substrate or the substrate can be immersed in a volume of the liquid water. Alternatively water vapour in a carrier gas, such as air or nitrogen, can be passed over the substrate. When the substrate has been treated with vanadium oxychloride this treatment with water produces vanadium pentoxide and hydrogen chloride is liberated. Cessation of evolution of hydrogen chloride is indicative of completion of the reaction.

Treatment of the substrate with water vapour in a carrier gas can be effected at an elevated temperature of say up to 500° C. although temperatures less than 300° C. are more commonly employed.

After treatment with water it is usual to dry the product at an elevated temperature say about 100° C.

It has been found that when the substrate is heated with the organic solution at a temperature of 30° C. to 60° C. it is advantageous to repeat the treatment with organic solution after the first treatment and decomposition of the catalyst precursor. This further treatment can, if desired, be carried out after drying the product from the first treatment. It is believed that in this further treatment any bound water residues formed during the decomposition are reacted with the additional precursor.

When the substrate has been treated with vanadium oxychloride then it is usual finally to calcine the catalyst at an elevated temperature of say 400° C. to 600° C., preferably 450° C., to activate the product.

Titanium dioxide carrying vanadium pentoxide as a monolayer prepared by the method of this invention is an effective selective oxidation catalyst for oxidising o-xylene to phthalic anhydride. In such an oxidation process the catalyst is placed in an oxidation column and heated to a temperature of say, between 250° C. and 500° C. and a mixture of air and o-xylene passed through the column.

If desired prior to use small amounts of catalyst promoters can be added to the catalyst of the present invention.

The invention is illustrated in the following Examples.

EXAMPLE 1

Five grams of uncoated anatase titanium dioxide prepared by the sulphate process and having a surface area of 10 square meters per gram were heated at 150° C. for 18 hours to remove physisorbed water molecules from the surface. The dried catalyst substrate was then added to a flask containing 50 milliliters of a solution of benzene containing vanadium oxychloride in a concentration of 0.40% by volume.

The flask was placed in a water bath at 40° C. and shaken for 5 hours. The solution was filtered and the treated substrate was washed with benzene prior to drying in an oven for 1 hour at 110° C.

The dried treated substrate at room temperature was then mixed with a small amount of water and then dried for 18 hours at 110° C. to remove excess water and liberated hydrogen chloride.

The dried catalyst so obtained was then heated in air at 450° C. for 5 hours. The catalyst contained 1.20% by weight of vanadium pentoxide.

The catalyst was employed to catalyse the oxidation of o-xylene to phthalic anhydride. The catalyst was placed in tube to form a packed bed through which was passed a mixture of air and o-xylene. The bed of catalyst was maintained at 320° C.

Phthalic anhydride was recovered from the gas after passing through the bed in a yield of 80% at a conversion of 99%. The apparent activation energy was 125 kJ per mole.

EXAMPLE 2

The experiment described in Example 1 was repeated except that toluene was used instead of benzene as the organic solvent. The catalyst obtained contained 1.35% by weight of vanadium pentoxide.

When the catalyst obtained was used to promote the oxidation of o-xylene a yield of phthalic anhydride was obtained at 320° C. of 77.5% at a conversion of 98%.

EXAMPLE 3

The experiment described in Example 2 was repeated except that the anatase titanium dioxide was heated initially at 100° C. instead of 150° C.

The catalyst was used to promote the oxidation of o-xylene to phthalic anhydride and a yield of 78% was obtained at a conversion of 99% with an apparent activation energy of 127 kJ per mole.

EXAMPLE 4

The experiment described in Example 1 was repeated employing a concentration of 0.32% by volume of vanadium oxychloride in the solution. The catalyst contained 0.94% by weight of vanadium pentoxide. When the catalyst obtained was used in the oxidation of o-xylene to phthalic anhydride at a temperature of 320° C. the maximum yield of phthalic anhydride was 70% at a conversion of 56% with an apparent activation energy of 94 kJ per mole.

EXAMPLE 5

The experiment described in Example 1 was repeated except that the concentration of vanadium oxychloride in benzene was 0.16% by volume. The catalyst obtained contained 0.58% by weight of vanadium pentoxide.

When the catalyst was employed in the oxidation of o-xylene to phthalic anhydride the yield was 37% at a conversion of 75%. The temperature of oxidation was 350° C. and the apparent activation energy was 70 kJ per mole.

EXAMPLE 6

The experiment described in Example 1 was repeated except that the concentration of vanadium oxychloride in the benzene was 0.08% by volume. The catalyst obtained contained 0.40% by weight vanadium pentoxide.

When the catalyst was used in the oxidation of o-xylene to phthalic acid the yield was 7% at a reaction temperature of 330° C. at a conversion of 40%. The apparent activation energy was 43 kJ per mole.

EXAMPLE 7

The experiment described in Example 1 was repeated except that the flask containing the substrate and the solution of vanadium oxychloride were maintained at 10° C. whilst shaking for 5 hours. The catalyst obtained contained 0.33% by weight of vanadium pentoxide.

When used to promote the oxidation of o-xylene it was found that the maximum yield of 65% was obtained at 335° C. at a conversion of 92% and at an apparent activation energy of 91 kJ per mole.

EXAMPLE 9

The experiment described in Example 7 was repeated except that the substrate and the solution of vanadium oxychloride was maintained at 75° C. for 5 hours. The catalyst obtained contained 0.92% by weight vanadium pentoxide.

When used to promote the oxidation of o-xylene the maximum yield of phthalic anhydride was 85% at a temperature of 310° C. and conversion of 99%. The apparent activation energy was 134 kJ per mole.

EXAMPLE 9

The experiment described in Example 1 was repeated except that the substrate and the solution of vanadium oxychloride was maintained at 75° C. for 5 hours. Also, instead of mixing the dried treated substrate with a small amount of liquid water the substrate was treated with nitrogen gas saturated with water vapour. The catalyst finally obtained contained 1.30% by weight of vanadium pentoxide. When used to promote the oxidation of o-xylene the maximum yield of phthalic anhydride was 87% at a temperature of 310° C. and at a conversion of 97.5%. The apparent activation energy was 114 kJ per mole.

EXAMPLE 10

The experiment described in Example 9 was repeated except that the dried treated substrate was contacted with atmospheric air instead of nitrogen. No deliberate addition of water was made to the stream of air. The catalyst obtained contained 1.10% by weight vanadium pentoxide.

When used to promote the oxidation of o-xylene the maximum yield of phthalic anhydride was 85% by weight at a temperature of 319° C. and a conversion of 99%. The apparent activation energy was 104 kJ per mole.

EXAMPLE 11

The experiment described in Example 9 was repeated except that the dried treated catalyst substrate was maintained at 200° C. during the treatment with the stream of nitrogen saturated with water vapour. The catalyst obtained contained 1.4% by weight vanadium pentoxide.

When used to promote the oxidation of o-xylene the maximum yield of phthalic anhydride was 85% by weight at a temperature of 318° C. and a conversion of 98%. The apparent activation energy was 101 kJ per mole.

What is claimed is:

1. A method for the production of a monolayer catalyst which comprises mixing a chosen catalyst substrate having bound water residues on its surface and being substantially free of physisorbed water with a catalyst precursor decomposable to a catalytically effective compound with said precursor being dissolved in an organic solvent therefor, allowing said precursor to react with said bound water residues, removing any excessive precursor and solvent, decomposing said precursor reacted with said surface to a catalytically effective compound and recovering the so-treated catalyst substrate.

2. A method according to claim 1 in which the catalyst substrate prior to mixing with said catalyst precursor is heated at a temperature of up to 500° C. to reduce substantially any physisorbed water molecules on the surface of the particles of said substrate.

3. A method according to claim 2 in which the catalyst substrate is heated for a time of from 1 hour to 40 hours.

4. A method according to claim 1 in which the organic solvent is a liquid aromatic hydrocarbon.

5. A method according to claim 1 in which the concentration of the catalyst precursor in the organic solvent therefor is up to the maximum possible for the particular chosen solvent.

6. A method according to claim 1 in which the catalyst substrate has a surface area of about 10 square meters per gram.

7. A method according to claim 6 in which the amount of the precursor mixed with a catalyst substrate is from 0.5 to 10% by weight based on the weight of substrate.

8. A method according to claim 7 in which the amount of the precursor is from 1.5 to 6% by weight of catalyst substrate.

9. A method according to claim 1 in which said precursor is reacted with the bound water residues of the catalyst substrate by maintaining the mixture of catalyst substrate and the organic solution at a temperature of up to the boiling point of the solution and for a time such that the reaction reaches equilibrium.

10. A method according to claim 9 in which the time of treatment is up to 24 hours.

11. A method according to claim 10 in which the time is from 3 to 10 hours.

12. A method according to claim 1 in which the precursor reacted with the surface of the catalyst substrate is decomposed by hydrolysis with water.

13. A method according to claim 12 in which water in the liquid form is employed for the hydrolysis.

14. A method according to claim 12 in which the water is in the form of water vapour in a carrier gas.

15. A method according to claim 12 in which the hydrolysis is carried out at an elevated temperature of up to 500° C.

16. A method according to claim 1 in which the catalyst substrate mixed with the organic solution is heated at a temperature of from 30° C. to 60° C. to effect reaction of said precursor with the bound water residues and after decomposition of said precursor the treated catalyst substrate is again mixed with a further quantity of an organic solution of said precursor, heated at a temperature of 30° C. to 60° C. and this additional amount of catalyst precursor decomposed prior to recovery of the so-treated catalyst substrate.

17. A method according to claim 1 in which the treated catalyst substrate after decomposition of said precursor is dried at an elevated temperature.

18. A method for the production of a monolayer catalyst which comprises heating a particulate titanium dioxide substrate having bound water residue on its surface to remove substantially all the physisorbed water from the surface of the particles, mixing the particulate titanium dioxide so obtained with vanadium oxychloride dissolved in an organic solvent therefor and agitating the mixture at an elevated temperature to effect combination of the vanadium oxychloride with the surface of the particulate titanium dioxide, separating the so treated substrate from any unreacted vanadium oxychloride and organic solvent, reacting the treated substrate with water to form vanadium pentoxide in association with the surface of the substrate and drying the product prior to optionally heating the product to further activate the catalyst so obtained.

19. A method according to claim 18 in which the organic solvent is benzene, toluene or o-xylene.

20. A method according to claim 18 in which the concentration of the vanadium oxychloride in the organic solvent is from 0.1 to 5 parts by volume of vanadium oxychloride per 100 parts by volume of solvent.

21. A method according to claim 19 in which the concentration of vanadium oxychloride is from 0.1 to 0.7 part by volume per 100 parts of organic solvent.

22. A method according to claim 18 in which the substrate after recovery and carrying vanadium pentoxide is calcined at a temperature of 400° C. to 600° C. to further activate the product.

* * * * *